W. C. MARTYN.
TRACTOR.
APPLICATION FILED APR. 27, 1912.
1,068,598.
Patented July 29, 1913.
2 SHEETS—SHEET 1.
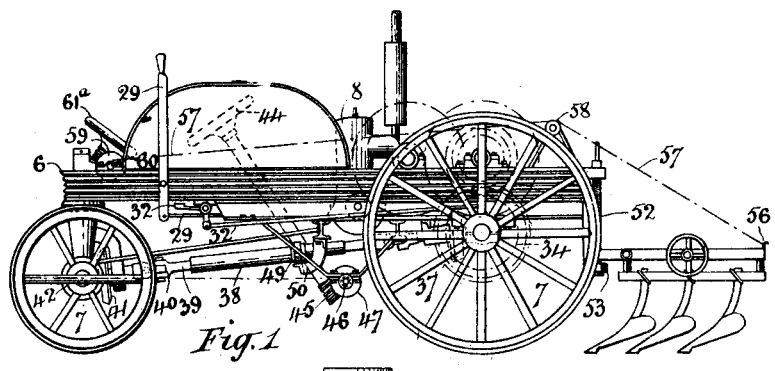
Fig. 1
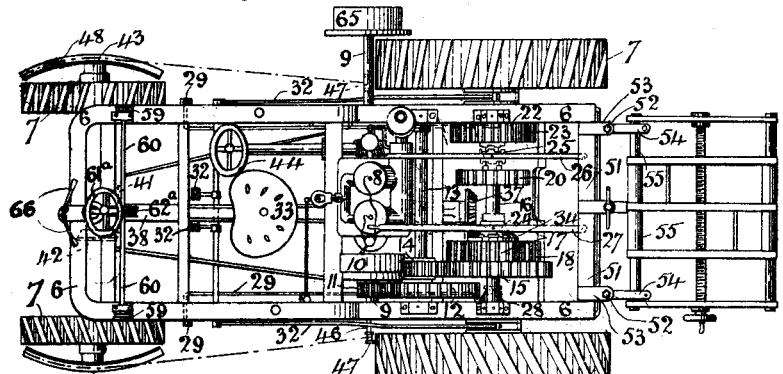
Fig. 2
Fig. 3
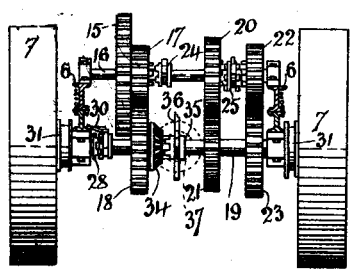
Witnesses
Wm. F. Davidson.
H. E. Brady
Inventor
W. C. Martyn
By Pray H Moore
Atty.

W. C. MARTYN.
TRACTOR.
APPLICATION FILED APR. 27, 1912.

1,068,598.

Patented July 29, 1913.
2 SHEETS—SHEET 2.

Witnesses
Wm F. Davidson
M. Bready

Inventor
W. C. Martyn
By Percy ...
Atty

UNITED STATES PATENT OFFICE.

WILLIAM CLIFFORD MARTYN, OF ST. KILDA, VICTORIA, AUSTRALIA.

TRACTOR.

1,068,598.  Specification of Letters Patent.  Patented July 29, 1913.

Application filed April 27, 1912. Serial No. 693,697.

*To all whom it may concern:*

Be it known that I, WILLIAM CLIFFORD MARTYN, a subject of the King of Great Britain, residing at 23 Alma road, St. Kilda, Victoria, Australia, have invented certain new and useful Improvements in Tractors, of which the following is a specification.

Figure 4:
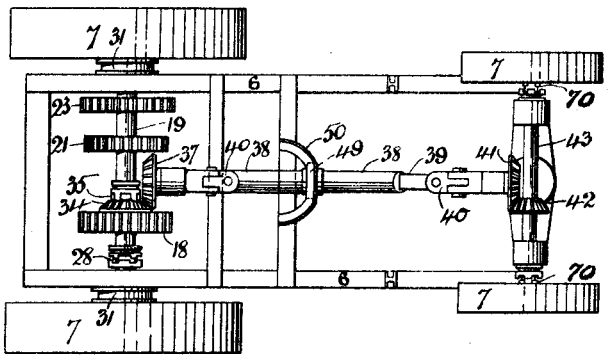
Figure 5:
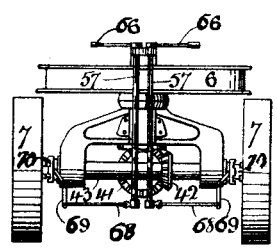

My invention refers to tractors for transport purposes and for use with agricultural implements and for other work, and aims at the construction of a machine all the wheels of which shall be capable of being simultaneously driven from one engine or motor mounted upon the same. Means are provided whereby all the wheels may be kept in gear and so driven or whereby one or more of the wheels can be cut out and be thereby permitted to run free, as may be found desirable. Means are also employed and mechanism will hereinafter be described for cutting out the different wheels and for communicating power to and for cutting out the same from the steering wheels of the machine, for lifting a trailing plow and for steering the vehicle. But in order to fully understand the invention reference will be had to the accompanying drawings, in which, Figure 1 is a side elevation of my tractor with plow attached. Fig. 2 is a plan of the same. Fig. 3 shows in end view part of the driving gear. Fig. 4 is an underneath plan of the vehicle, and Fig. 5 a front elevation showing how the front wheels can be thrown out of gear through their clutches.

The machine frame 6 is mounted on the wheels 7 and supports the various mechanisms and the engine or motor 8, upon the shaft 9 of which is a friction clutch 10 and a spur pinion 11 which meshes with a spur wheel 12 on the first motion shaft 13. On the latter shaft is also the shrouded pinion 14 in gear with the wheel 15 mounted on the shaft 16. Integral with wheel 15 is the pinion 17 in mesh with the spur wheel 18 on shaft 19 upon which the main carrying wheels are mounted. Referring again to shaft 16, another pinion 20 of larger diameter than 17 is upon this shaft and in mesh with wheel 21 on 19, while a third wheel 22 gears with a like wheel 23 but of greater diameter, situated also on shaft 19. Wheels 15, 17, 20 and 22 run freely and 17 is provided with claw clutch 24 and 20 and 22 with a double claw clutch 25 actuated by a lever 26 while clutch 24 is fitted with the hand lever 27 (Fig. 2). By means of the above system of wheels and clutches three speeds may be obtained as will be evident from the drawings, the wheels being designed to give speeds of from say 2½ to 7 miles per hour.

Referring now to shaft 19, the wheels 18, 21 and 23 will be keyed to the same, but there will be claw clutches 28 for the purpose of throwing out of gear the rear carrying wheels 7. In the drawings only one of these clutches is shown but they are operated through hand levers 29 and bell cranks 30. In addition to the clutches the rear wheels 7 are provided with brake drums 31 actuated through foot levers 32 from the driving seat 33. Mounted also on the shaft 19 is the bevel pinion 34 and claw clutch 35 operated through a suitable hand lever 36 (part only shown). Pinion 34 meshes with bevel wheel 37 secured on the end of a telescopic shaft 38 having a bore square in cross section into which the complementary piece 39 takes. There are universal joints 40 in the shaft and on its forward end is mounted a bevel pinion 41 which is in mesh with a like wheel 42 on the front or steering wheel axle 43. Motion is conveyed from the shaft 19 through the wheel 34, clutch 35, and telescopic shaft 38 to the front wheels of the machine which can be turned about the king bolt by the steering wheel 44, the shaft 38 accommodating itself through the telescopic and universal joints as the direction of the steering wheels is altered.

The shaft 38 is conveniently supported by brackets and about its medial part it is provided with a roller or loose collar 49 which as the position of the shaft alters due to the direction of the steering wheels, will roll on the quadrantal bracket 50 (Fig. 4) that acts as a support.

The steering wheel worm 45 takes into a worm wheel on a spindle 46 placed transversely in the machine frame on the extremities of which are small gipsy pulleys 47 upon which is respectively underled and overled the chain wind for steering, the other end of the chains being attached to the quadrants 48 on the steering wheel shaft 43.

In Figs. 1 and 2 I have shown a trailing plow which is suitably attached to the tractor and adapted to be lifted or swung clear of the ground when not required. This is effected by attaching to the back of the tractor a sliding cross bar 51 so arranged that it can slide on vertical rods 52 supported at each of their ends by lugs 53 projecting from and attached to the tractor. Each end of the bar 51 is provided with a bearing 54 to receive the loosely mounted transverse rod or bar 55 to which can be attached the draft gear of the plow, implement or vehicle. The rear of the plow frame is provided with a hook 56 at each rear corner to which a rope or chain 57 is attached. These are carried forward in the machine over riding pulleys or fairleads 58 to other pulleys 59 on a transverse spindle 60. The pulleys 59 are rotated through the hand wheel 61$^a$ and on its spindle is a worm taking into worm wheel 62$^a$ on the spindle 60. When the wheel 61$^a$ is turned the effect will be to wind in the ropes or chains 57 and to raise the plow frame and the shares clear of the ground.

I have stated that either one or both of the rear or main carrying wheels 7 can be thrown out of gear through levers 29 as would be desirable in certain circumstances such as in turning with a short radius in which case the near wheel would be freed and the off wheel driven; or in negotiating soft and yielding ground when it might be desirable in order to extricate the tractor to free both the rear wheels and drive with the steering wheels. In some cases where great tractive force is necessary all four wheels will be driving wheels, but in driving with the steering wheels alone the power will be conveyed from the motor through wheels 11, 12, 14, 15, 18 and the bevel wheels 34 and 37, clutch 35, telescopic shaft 38, and wheels 41 and 42. Should it be necessary to drive only one steering wheel as when negotiating a sharp curve as at the end of a furrow and before commencing a new one, a hand lever 66 will be used to throw out the wheel desired. These hand levers are respectively attached to vertical rods 67 the lower ends of which are connected to rods 68 in turn connected to bell cranks 69, fulcrumed on the front axle mounting. By putting over one or both the levers 66 one or both the claw clutches 70 on the shaft 43 will be thrown into gear with the wheels 7. Both the steering wheels may be thrown out through the clutch 35 on shaft 19.

On the main engine shaft 9 may be mounted a pulley 65 which can be used to drive stationary machines such as pumps, chaff cutters, circular saws and the like when the tractor gear has been thrown out of action by means of the different clutches of the disk clutch 10.

It will be evident that in designing the wheels for conveying power to the carrying wheels of the tractor, they will be such that the transport speed of each carrying wheel shall be the same.

In constructing my improved tractor I have avoided the use of sprocket and chain gearing as I have found that the same is much less satisfactory than the direct and intermeshing gearing I have herein described and shown.

In practice, my improved tractor will, by means of the different mechanisms, be capable of being driven and steered from the front wheel axle, of turning in a short radius and of being placed in situations and extricated therefrom where without my invention it would be extremely difficult, if not impossible, to handle the machine satisfactorily and usefully.

Having now described my invention what I claim as new and desire to secure by Letters Patent is:—

In a tractor, the combination of a telescopic shaft having universal joints, means for imparting variable speeds to the shaft and for conveying the motions of the same to the steering wheels of the vehicle, means for throwing in or out of gear either one or both steering wheels, a quadrantal bracket held in the underframe of the vehicle, a loose collar upon the telescopic shaft that will roll upon the bracket acting as a support for the shaft and means whereby from one engine or prime mover all the carrying wheels of the vehicle may be driving wheels or one or more be cut out to run freely, or the steering wheels alone be used as drivers through the agency of the said telescopic shaft as herein set forth.

In witness whereof I have hereunto signed my name in the presence of two subscribing witnesses.

WILLIAM CLIFFORD MARTYN.

Witnesses:
   P. M. NEWTON,
   M. ALLAN.